United States Patent
Ishida et al.

(10) Patent No.: US 6,723,824 B1
(45) Date of Patent: Apr. 20, 2004

(54) OPTICAL DISK SUBSTRATE AND MOLDING MATERIAL THEREFOR

(75) Inventors: Makoto Ishida, Tokyo (JP); Tsukasa Saito, Tokyo (JP)

(73) Assignee: Teijin Chemicals, Ltd., Tokyo (JP)

( * ) Notice: Subject to any disclaimer, the term of this patent is extended or adjusted under 35 U.S.C. 154(b) by 0 days.

(21) Appl. No.: 10/168,829

(22) PCT Filed: May 25, 2000

(86) PCT No.: PCT/JP00/03362

§ 371 (c)(1), (2), (4) Date: Jun. 25, 2002

(87) PCT Pub. No.: WO01/90214

PCT Pub. Date: Nov. 29, 2001

(51) Int. Cl.[7] ............................................. C08G 64/00

(52) U.S. Cl. .................... 528/196; 264/176.1; 264/219; 359/109; 369/47; 369/59.11; 428/64; 528/198

(58) Field of Search ................................ 528/196, 198; 428/64; 264/176.1, 219; 359/109; 369/47, 59.11

(56) References Cited

FOREIGN PATENT DOCUMENTS

| | | |
|---|---|---|
| EP | 1174235 | 1/2002 |
| JP | 02-135222 | 5/1990 |
| JP | 08-59975 | 3/1996 |
| JP | 2000-26592 | 1/2000 |
| JP | 2000-163807 | 6/2000 |
| JP | 2000-173100 | 6/2000 |
| JP | 2000-173808 | 6/2000 |
| WO | WO 00/22044 | 4/2000 |

*Primary Examiner*—Terressa Boykin
(74) *Attorney, Agent, or Firm*—Wenderoth, Lind & Ponack L.L.P.

(57) ABSTRACT

An optical disk substrate formed of an aromatic polycarbonate resin obtained by a reaction between an aromatic dihydroxy compound and a carbonate diester and in which the content of undissolved substances that emit light by irradiation with light having a wavelength of 380 nm and have a size of 30 $\mu$m or greater is 100 pieces or less per kg of said resin, and a molding material therefor.

According to the present invention, there can be provided an optical disk substrate in which the number of white spots that occur in the passage of a long period of time is very small and the reliability of writing and reading of information is highly stable.

19 Claims, No Drawings

OPTICAL DISK SUBSTRATE AND MOLDING MATERIAL THEREFOR

DETAILED DESCRIPTION OF THE INVENTION

1. Field of the Invention

The present invention relates to an optical disk substrate and a molding material therefor. More specifically, it relates to an optical disk substrate that is formed of an aromatic polycarbonate resin and can maintain high reliability for a long period of time, and a molding material therefor.

2. Prior Art

For a transparent substrate of an optical information recording medium that is a recording medium for recording and/or reproducing information with a laser beam, such as an audio disk, a laser disk, an optical disk memory, a magneto-optical disk, that is, for an optical disk substrate, generally, a polycarbonate resin is used, which is excellent over other resins in moldability, mechanical strength, transparency, and the like. However, the polycarbonate resin having the above excellent properties has a defect that it is easily hydrolyzed at a high temperature under a high humidity to decrease its molecular weight and impact strength. Further, it has a defect that its reliability that should extend for a long period of time is impaired, since a substrate made thereof is caused to have white spots when left at high temperatures under high humidity for a long period of time. At present, further, in substrate materials for high-density optical disks typified by DVD-ROM, DVD-Video, DVD-Audio, DVD-R and DVD-RAM as digital versatile disks (DVD), it is being required to satisfy higher-degree longer-term reliability.

As a method for producing a polycarbonate resin, there is known an interfacial polycondensation method in which a dihydroxy compound and phosgene are directly reacted or a melt-polymerization method in which a dihydroxy compound and carbonate diester are allowed to undergo an ester interchange reaction under heat and under reduced pressure. Of these methods, the later melt-polymerization method has an advantage that a polycarbonate resin can be produced at a low cost as compared with the former interfacial polycondensation method.

Generally, a method for producing an aromatic polycarbonate according to a conventional melt-polymerization method uses, as a catalyst component, a metal catalyst such as an alkali metal compound or an alkaline earth metal compound. For example, JP-A-8-59975 includes a description concerning a method for producing an aromatic polycarbonate according to the melt-polymerization method.

Disk substrates for an optical disk, a laser disk, etc., are generally produced by injection molding, and a molding temperature is a high temperature of 300° C. or higher. Further, a continuous production is required, so that the polycarbonate resin is required to have high thermal stability. However, an aromatic polycarbonate resin obtained by a melting method in the presence of the above metal catalyst is sometimes partially pyrolyzed during melt-molding due to a residual metal catalyst, and the aromatic polycarbonate resin is poor in thermal stability. Further, a disk is caused to have white spots in its substrate when left at high temperatures under high humidity for a long period of time, and it has a defect that its reliability that should extend for a long period of time is impaired. In recent years, the disk substrates are increasingly required to have further improved performances including a solution to the above problem.

Meanwhile, for applying an aromatic polycarbonate resin to an optical disk substrate, it is proposed to decrease a gelled substance content in the resin to a specific range.

That is, it is described in JP-A-2-135222 that a gelled substance is present in an aromatic polycarbonate resin and that the content of the gelled substance is decreased to a specific range. In the above known technique, the gelled substance present in the resin causes a refractive index anomaly in an optical use (particularly, a use for an optical disk), so that the number of gelled substances is limited to 50 pieces or less per kg of the resin. The above gelled substance refers to a substance that remains on a filter having openings having a diameter of 20 $\mu$m each when a solution of the resin in methylene chloride is filtered. The above known technique is specifically intended for application to a resin obtained by a method in which an aromatic dihydroxy compound and phosgene are reacted in an organic solvent such as methylene chloride (generally referred to as "solution polymerization method"). That is, a resin according to the above solution polymerization method is obtained in the form of a powder, and when the powder is pelletized by extrusion with an extruder, the resin suffers a heat hysteresis in the extruder. The above known technique is intended for limiting the amount of gelled substances that occur during such an occasion to a specific range.

According to studies made by the present inventors, it has been found that, when a resin powder obtained by the above solution polymerization method is melt-pelletized and when pellets are molded into a disk substrate, the number of refractive index anomalies of the disk substrate to be formed is decreased by decreasing the number of gelled substances in the pellets. The present inventors have made further studies and have found that a disk substrate whose gelled substance content is decreased by the above known method shows a decrease in the number of refractive index anomalies immediately after its molding, but that when it is held for a long period of time, particularly, when it is held under high humidity at a high temperature for a long period of time, white spots occur in the substrate and impede reading and reproducing the recorded information. While the cause therefor is not clear, it is presumably caused by inherent impurities such as a catalyst (e.g., sodium, etc.) and an organic solvent (e.g., methylene chloride) used in the solution polymerization method and oligomers.

PROBLEMS TO BE SOLVED BY THE INVENTION

Meanwhile, the present inventors have studied application of an aromatic polycarbonate resin obtained by a reaction between an aromatic dihydroxy compound and a carbonate diester (also generally called "melt polymerization method") to disk substrates.

In the above melt polymerization method, a resin suffers heat hysteresis at a high temperature for a long period of time beyond comparison in the process of the polymerization as compared with the above solution polymerization. Therefore, there occur a large amount of undissolved substances that are insoluble in methylene chloride solvent while they are not removable through a filter of an extruder. The present inventors have studied these undissolved substances and have found that the behavior thereof differs from that of the above gelled substance involved in the solution polymerization method. The types and numbers of the undissolved substances in a resin obtained by a melt polymerization method are larger than the types and number of those in a resin obtained by a solution polymerization method. Studies have been made with regard to influences of the types and number of the undissolved substances on refractive index anomalies and the formation of white spots found after holding for a long period of time.

As a result, it has been found that the number of luminous undissolved substances generated by irradiation with specific wavelength (wavelength of 380 nm), of the undissolved substances in a resin, has something to do with the number of white spots that occur after the holding for a long period of time and that the number of white spots to occur can be decreased to a tolerance limit or less by decreasing such specific undissolved substances to a specific number or less.

That is, according to the studies by the present inventors, the tolerance range of the number of the undissolved substances that emit light by irradiation with a wavelength of 380 nm, in a resin obtained by a melt polymerization method, is 100 pieces or less per kg of the resin. While this tolerance range is broader than the tolerance range (50 pieces or less) of gelled substances in the above known technique, it is presumably because the behavior of the undissolved substances caused by the inherent catalyst and polymerization conditions of the melt polymerization method differs from the counterpart in the solution polymerization method that the number of the white spots to occur after a disk substrate is held for a long period of time is remarkably decreased.

The present invention has been arrived at on the basis of the revealed fact above.

MEANS TO SOLVE THE PROBLEM

The undissolved substances that emit light by irradiation with light having a wavelength of 380 nm in the polycarbonate resin is assumed to be substances that emit fluorescence due to salicylic acid ester structure thereof. In an optical disk substrate formed of a polycarbonate resin produced by a melt-polycondensation method using a catalyst in a high-temperature reduced pressure state, the content of the above substances tends to increase. However, it has not been known that an optical disk substrate is improved in reliability for a long period of time by decreasing the above light-emitting substances to a specific range or less.

According to the present invention, there is provided a molding material for optical use, which is an aromatic polycarbonate resin obtained by a reaction between an aromatic dihydroxy compound and a carbonate diester and in which the content of undissolved substances that emit light by irradiation with light having a wavelength of 380 nm and have a size of 30 μm or greater is 100 pieces or less per kg of said resin.

According to the present invention, further, there is provided an optical disk substrate formed of an aromatic polycarbonate resin obtained by a reaction between an aromatic dihydroxy compound and a carbonate diester and in which the content of undissolved substances that emit light by irradiation with light having a wavelength of 380 nm and have a size of 30 μm or greater is 100 pieces or less per kg of said resin.

The present invention will be explained more specifically hereinafter.

The polycarbonate resin used in the present invention is a resin obtained by a melt-polymerization method based on an ester interchange of a dihydric phenol and a carbonate precursor. Typical examples of the dihydric phenol used above include hydroquinone, resorcinol, 1,6-dihydroxynaphthalene, 2,6-dihydroxynaphthalene, 4,4'-dihydroxydiphenyl, bis(4-hydroxyphenyl)methane, 1,1-bis(4-hydroxyphenyl)-1-phenylmethane, bis{(4-hydroxy-3,5-dimethyl)phenyl}methane, 1,1-bis(4-hydroxyphenyl)ethane, 1,2-bis(4-hydroxyphenyl)ethane, 1,1-bis(4-hydroxyphenyl)-1-phenylethane, bis(4-hydroxyphenyl)diphenylmethane, bis(4-hydroxyphenyl)-1-naphthylmethane, 2,2-bis(4-hydroxyphenyl)propane (so-called bisphenol A), 2-(4-hydroxyphenyl)-2-(3-hydroxyphenyl)propane, 2,2-bis{(4-hydroxy-3-methyl)phenyl}propane, 2,2-bis{(4-hydroxy-3,5-dimethyl)phenyl}propane, 2,2-bis{(3,5-dibromo-4-hydroxy)phenyl}propane, 2,2-bis{(3,5-dichloro-4-hydroxy)phenyl}propane, 2,2-bis{(3-bromo-4-hydroxy)phenyl}propane, 2,2-bis{(3-chloro-4-hydroxy)phenyl}propane, 4-bromoresorcinol, 2,2-bis{(3-isopropyl-4-hydroxy)phenyl}propane, 2,2-bis{(3-phenyl-4-hydroxy)phenyl}propane, 2,2-bis{(3-ethyl-4-hydroxy)phenyl}propane, 2,2-bis{(3-n-propyl-4-hydroxy)phenyl}propane, 2,2-bis{(3-sec-butyl-4-hydroxy)phenyl}propane, 2,2-bis{(3-tert-butyl-4-hydroxy)phenyl}propane, 2,2-bis{(3-cyclohexyl-4-hydroxy)phenyl}propane, 2,2-bis{(3-methoxy-4-hydroxy)phenyl}propane, 2,2-bis(4-hydroxyphenyl)hexafluoropropane, 1,1-dibromo-2,2-bis(4-hydroxyphenyl)ethylene, 1,1-dichloro-2,2-bis{(3-phenoxy-4-hydroxy)phenyl}ethylene, ethylene glycol bis(4-hydroxyphenyl)ether, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 1,1-bis(4-hydroxyphenyl)isobutene, 2,2-bis(4-hydroxyphenyl)pentane, 2,2-bis(4-hydroxyphenyl)-4-methylpentane, 3,3-bis(4-hydroxyphenyl)pentane, 1,1-bis(4-hydroxyphenyl)cyclohexane, 1,1-bis(4-hydroxyphenyl)-4-isopropylcyclohexane, 1,1-bis(4-hydroxyphenyl)-3,3,5-trimethylcyclohexane, 1,1-bis(4-hydroxyphenyl)cyclodecane, 9,9-bis(4-hydroxyphenyl)fluorene, 9,9-bis{(4-hydroxy-3-methyl)phenyl}fluorene, α,α'-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamantane, 4,4'-dihydroxydiphenylsulfone, bis{(3,5-dimethyl-4-hydroxy)phenyl}sulfone, 4,4'-dihydroxydiphenylsulfoxide, 4,4'-dihydroxydiphenylsulfide, 4,4'-dihydroxydiphenylketone, 4,4'-dihydroxydiphenyl ether and 4,4'-dihydroxydiphenyl ester. These may be used alone or in combination of two or more.

Our of these, preferred is a homopolymer or copolymer obtained from at least one bisphenol selected from the group consisting of bisphenol A, 2,2-bis{(4-hydroxy-3-methyl)phenyl}propane, 2,2-bis{(3,5-dibromo-4-hydroxy)phenyl}propane, ethylene glycol bis(4-hydroxyphenyl)ether, 2,2-bis(4-hydroxyphenyl)hexafluoropropane, 2,2-bis(4-hydroxyphenyl)butane, 1,1-bis(4-hydroxyphenyl)cyclohexane, 1,1-bis(4-hydroxyphenyl)-3,3,5-trimethylcyclohexane, 4,4'-dihydroxydiphenylsulfone, bis{(3,5-dimethyl-4-hydroxy)phenyl}sulfone, 4,4'-dihydroxydiphenylsulfoxide, 4,4'-dihydroxydiphenylsulfide, and 4,4'-dihydroxydiphenyl ketone. A homopolymer of bisphenol A is particularly preferred.

The carbonate precursor is selected from carbonate ester or haloformate. Specifically, the carbonate precursor includes diphenyl carbonate, ditolyl carbonate, bis(chlorophenyl)carbonate, m-cresyl carbonate, dinaphthyl carbonate, bis(diphenyl)carbonate, dimethyl carbonate, diethyl carbonate, dibutyl carbonate and dicyclohexyl carbonate, although the carbonate precursor shall not be limited thereto. Preferably, diphenyl carbonate or dihaloformate of a dihydric phenol is used, and more preferably, diphenyl carbonate is used. These carbonate esters may be used alone or in combination of two or more.

When the polycarbonate resin is produced by reacting the above dihydric phenol and the above carbonate precursor according to a melt-polymerization method, a catalyst, a terminal stopper and an antioxidant for the dihydric phenol may be used as required. The polycarbonate resin may be a polyester carbonate resin formed by copolymerizing an aromatic or aliphatic difunctional carboxylic acid or may be a mixture containing two or more polycarbonate resins obtained.

The reaction according to a melt-polymerization method is an ester interchange reaction between the dihydric phenol and the carbonate ester, and the reaction is carried out by a method in which in the presence of an inert gas, the dihydric phenol and the carbonate ester are mixed under heat and a formed alcohol or phenol is distilled off. While the reaction temperature differs depending upon the boiling point, etc., of the formed alcohol or phenol, it is generally in the range of from 120 to 350° C. In a later stage of the reaction, the formed alcohol or phenol can be easily distilled off by reducing the pressure of the reaction system to approximately 10 to 0.1 Torr (1,333 to 13.3 MPa). The reaction time period is generally about 1 to 4 hours.

In the melt-polymerization method, further, a polymerization catalyst may be used for promoting the polymerization rate. As a polymerization catalyst, for example, a catalyst containing (i) an alkali metal compound and/or (ii) a nitrogen-containing basic compound is used, and condensation is carried out.

Examples of the alkali metal compound used as a catalyst include hydroxide, hydrogencarbonate, carbonate, acetate, nitrate, nitrite, sulfite, cyanate, thiocyanate, stearate, hydroborate, benzoate and phosphorohydride of alkali metal, and alkali metal salts of bisphenol and phenol.

Specific examples of the alkali metal compound include sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium nitrate, potassium nitrate, lithium nitrate, sodium nitrite, potassium nitrite, lithium nitrite, sodium sulfite, potassium sulfite, lithium sulfite, sodium cyanate, potassium cyanate, lithium cyanate, sodium thiocyanate, potassium thiocyanate, lithium thiocyanate, sodium stearate, potassium stearate, lithium stearate, sodium boron hydroxide, lithium boronhydroxide, potassium boronhydride, sodium boron phenylate, sodium benzoate, potassium benzoate, lithium benzoate, disodium hydrogen phosphate, dipotassium hydrogen phosphate, dilithium hydrogen phosphate, disodium salt, dipotassium salt and dilithium salt of bisphenol A, and sodium salt, potassium salt and lithium salt of phenol.

The alkali metal compound as a catalyst can be used in an amount range of from $10^{-9}$ to $10^{-4}$ mol, preferably $10^{-8}$ to $10^{-5}$ mol, per mole of the dihydric phenol. When the amount of the alkali metal compound is outside the above range, undesirably, there is a problem that it causes a detrimental effect on various physical properties of a polycarbonate to be obtained, or that the ester interchange reaction does not fully proceed, so that a polycarbonate having a high molecular weight cannot be obtained.

Examples of the nitrogen-containing basic compound as a catalyst include ammonium hydroxides having an alkyl, aryl or alkylaryl group such as tetramethylammonium hydroxide ($Me_4NOH$), tetraethylammonium hydroxide ($Et_4NOH$), tetrabutylammonium hydroxide ($Bu_4NOH$), benzyltrimethylammonium hydroxide ($\phi$-$CH_2(Me)_3NOH$) and hexadecyltrimethylammonium hydroxide; tertiary amines such as triethylamine, tributylamine, dimethylbenzylamine, and hexadecyldimethylamine; and basic salts such as tetramethylammonium borohydride ($Me_4NBH_4$), tetrabutylammonium borohydride ($Bu_4NBH_4$), tetrabutylammonium tetraphenylborate ($Bu_4NBPh_4$) and tetramethylammonium tetraphenylborate, ($Me_4NBPh_4$). Of these, tetramethylammonium hydroxide ($Me_4NOH$), tetraethylammonium hydroxide ($Et_4NOH$) and tetrabutylammonium hydroxide ($Bu_4NOH$) are preferred, and tetramethylammonium hydroxide ($Me_4NOH$) is particularly preferred.

The above nitrogen-containing basic compound is preferably used in such an amount that the amount of ammonium nitrogen atoms in the nitrogen-containing basic compound per mole of the dihydric phenol is from $1\times10^{-5}$ to $1\times10^{-3}$ equivalent weight. The above amount is more preferably such that the amount based on the same standard is from $2\times10^{-5}$ to $7\times10^{-4}$ equivalent weight, and particularly preferably such that the amount based on the same standard is from $5\times10^{-5}$ to $5\times10^{-4}$ equivalent weight.

In the present invention, there may be used a catalyst generally used for an esterification or ester interchange reaction as required, and such catalyst includes alkoxides of an alkali metal or alkaline earth metal, organic acid salts of an alkali metal or alkaline earth metal, zinc compounds, boron compounds, aluminum compounds, silicon compounds, germanium compounds, organotin compounds, lead compounds, osmium compounds, antimony compounds, manganese compounds, titanium compounds and zirconium compounds. The above catalysts may be used alone or in combination of two or more. The amount of the above polymerization catalyst per mole of the dihydric phenol as a raw material is determined preferably to be $1\times10^{-9}$ to $1\times10^{-5}$ equivalent weight, more preferably to be $1\times10^{-8}$ to $5\times10^{-6}$ equivalent weight.

In the above polymerization, further, the following compound may be added at a later stage, or after the end of the polycondensation, for decreasing phenolic terminal groups. Such a compound includes phenol, p-tert-butylphenol, p-tert-butylphenylphenyl carbonate, p-tert-butylphenyl carbonate, p-cumylphenol, p-cumylphenylphenyl carbonate, p-cumylphenyl carbonate, bis(chlorophenyl)carbonate, bis(bromophenyl)carbonate, bis(nitrophenyl)carbonate, bis(phenylphenyl)carbonate, chlorophenylphenyl carbonate, bromophenylphenyl carbonate, nitrophenylphenyl carbonate, diphenyl carbonate, methoxycarbonylphenylphenyl carbonate, 2,2,4-trimethyl-4-(4-hydroxyphenyl)chroman, 2,4,4-trimethyl-2-(4-hydroxyphenyl)chroman and ethoxycarbonylphenylphenyl carbonate. Of these, 2-chlorophenylphenyl carbonate, 2-methoxycarbonylphenylphenyl carbonate and 2-ethoxycarbonylphenylphenyl carbonate are preferred, and 2-methoxycarbonylphenylphenyl carbonate is particularly preferred.

In the present invention, terminals of the polycarbonate resin may be blocked with a terminal blocker. Further, desirably, the concentration of terminal hydroxyl groups of the polycarbonate resin before addition of the terminal blocker on the basis of the total terminals is adjusted to at least 20 mol %, preferably to at least 30 mol %, still more preferably to at least 40 mol %. In this manner, a specific terminal group can be introduced at a high amount ratio, and a high modification effect of the polycarbonate resin can be attained. Generally, concerning the concentration of terminal hydroxy groups of the polycarbonate resin based on the total terminals, it is advantageous to use the terminal blocker for a polycarbonate resin having hydroxyl groups whose concentration based on the total terminals is in the range of from 30 to 95 mol %. The amount ratio of the hydroxyl group terminals of the polycarbonate resin before addition of the terminal blocker can be controlled on the basis of the amount ratio of the dihydric phenol and the diphenyl carbonate that are charged as raw materials. The molar amount of the above concentration of the terminal hydroxyl groups in a constant amount of the polycarbonate resin can be determined by a conventional method using $^{1}$H-NMR.

When the molar amount of the total terminals of the polycarbonate resin of the present invention is 100 mol %, the molar amount of the terminal hydroxyl group of the polycarbonate resin is controlled to be preferably 10 to 70 mol %, more preferably 15 to 65 mol %, still more preferably 20 to 60 mol %, most preferably 20 to 45 mol %. The above mole percentage of the terminal hydroxyl groups of the aromatic polycarbonate resin can be determined by a conventional method using $^{1}$H-NMR.

The molecular weight, as a viscosity average molecular weight (M), of the polycarbonate resin is preferably 10,000 to 22,000, more preferably 12,000 to 20,000, particularly preferably 13,000 to 19,000. The aromatic polycarbonate resin having such a viscosity average molecular weight is preferred, since it gives sufficient strength, attains excellent melt flowabillty during molding and causes no molding strain. The viscosity average molecular weight that is referred to in the present invention is determined by inserting into the following expression a specific viscosity ($\eta_{sp}$) determined using a solution prepared by dissolving 0.7 g of the polycarbonate resin in 100 ml of methylene chloride at 20° C.

$\eta_{sp}/c=[\eta]+0.45\times[\eta]^2 c$ (in which [$\eta$] is an intrinsic viscosity)

[$\eta$]=1.23×10$^{-4}$M$^{0.83}$ c=0.7

After the polycarbonate resin is produced by a melt-polymerization method known per se, and in an extrusion step of obtaining a polycarbonate resin in the form of pellets to be supplied to injection molding (pelletization step), preferably, foreign matter is removed through a sintered metal filter having a filtering accuracy of 10 $\mu$m when the polycarbonate resin is in a molten state. It is preferred to add additives such as phosphorus-based antioxidant, etc., as required. In any case, it is required to decrease the contents of foreign matter, impurities, a solvent, etc., in the resin as a raw material before the injection molding so as to make them as small as possible. When an optical disk substrate is produced from the above polycarbonate resin, an injection molding machine (including an injection compression molding machine) is used. While the above injection molding machine can be selected from generally used injection molding machines, it is preferred to use an injection molding machine having a cylinder and a screw made of a material that has low adhesion to the resin and exhibits anti-corrosion properties and anti-wearing properties, in view of prevention of occurrence of a carbonaceious material and an improvement in reliability of the disk substrate. Concerning injection molding conditions, preferably, the cylinder temperature is from 300 to 400° C. and the mold temperature is from 50 to 140° C., and under these conditions, an optically excellent optical disk substrate can be obtained. In view of the object of the present invention, preferably, the molding environment is as clean as possible. It is also important to remove water by fully drying the material that is to be supplied to the molding and take care not to cause a residence that may cause decomposition of a molten resin.

The optical disk substrate of the present invention is formed of an aromatic polycarbonate resin which is obtained by a melt-polymerization method and in which the content of undissolved substances that emit light by irradiation with light having a wavelength of 380 nm and have a size of 30 $\mu$m or greater is 100 pieces or less per kg of the resin.

The undissolved substances that emit light by irradiation with light having a wavelength of 380 nm will be sometimes abbreviated as "light-emitting undissolved substances" hereinafter.

While the measurement of the above light-emitting undissolved substances will be explained in detail later, the measurement is conducted by dissolving a polycarbonate resin in methylene chloride, filtering a solution through a filter having openings having a diameter of 30 $\mu$m each (opening diameter), drying a residue on the filter and counting the number of substances that emit light by irradiation with light having a wavelength of 380 nm while observing the residue through an optical microscope. The number of the substances that emit light is converted to a value per kg of the resin, and the value. is taken as the content of the light-emitting undissolved substances.

The optical disk substrate of the present invention is formed of a polycarbonate resin having a light-emitting undissolved substance content of 100 pieces or less. The content of the light-emitting undissolved substances in the resin is preferably 80 pieces or less, particularly preferably 50 pieces or less.

In the present invention, it has been found that any optical disk substrate formed of a polycarbonate resin whose light-emitting undissolved substance content is decreased to the specific range or less as described above shows remarkably decreased occurrences of white spots not only immediately after molding but also after the passage of a long period of time. The optical disk substrate of the present invention is therefore excellent in storage of recordings and stability for a long period of time.

The present invention accordingly uses the resin whose light-emitting undissolved substance content is decreased to the above range, so that there can be provided optical disk substrates in which white spots having a size of 20 $\mu$m or greater each occur at an average of two or less per disk substrate (disk) having a diameter of 120 mm in an accelerated deterioration test of holding the optical disk substrates under conditions of a temperature of 80° C. and a relative humidity of 85% for 1,000 hours. Under optimum conditions, there are provided optical disk substrates in which the number of occurrence of the white spots is an average of 1.5 pieces or less, and under particularly optimum conditions, there are provided optical disk substrates in which the number of occurrence of the white spots is an average of 1 piece or less.

In the present invention, the means for obtaining a polycarbonate resin having a light-emitting undissolved substance content satisfying the above specific range includes the following means.

(1) Method in which a polycarbonate resin is dissolved in a good solvent such as methylene chloride, and a solution is filtered through a filter having openings having a diameter of 30 $\mu$m (opening diameter) or less at a normal temperature under normal pressure, to remove solids.

(2) When a polymerization catalyst, particularly, the sodium metal compound, is used as a catalyst in the polymerization of the polycarbonate resin, the basic nitrogen-containing compound is used in combination so that the amount of the sodium metal compound per mole of the aromatic dihydroxy compound is decreased to $1\times10^{-8}$ to $1\times10^{-5}$ mol, preferably $1\times10^{-8}$ to $5\times10^{-6}$ mol, particularly preferably $1\times10^{-8}$ to $6\times10^{-7}$ mol.

(3) In the step of producing the polycarbonate, polymerization conditions, particularly, temperature conditions are controlled. That is, means are selected such that the temperature in a highest temperature zone in the polymerization step does not exceed 340° C. Specifically, in the polymerization step, the number of rotation of a stirring blade is controlled. Further, means are selected such that a polymer temperature difference between a low-temperature zone and a high-temperature zone during the polymerization step (in a polymerization reactor) does not exceed 50° C. Such means will be explained further specifically later.

(4) The content of a polyfunctional compound in the dihydric phenol as a raw material, particularly in bisphenol, is decreased. That is, if the dihydric phenol as a raw material contains, as impurities, trifunctional or higher-functional compounds such as triphenol and tetraphenol, part of them cause light-emitting undissolved substances to occur.

Examples of the above triphenol includes compounds of the following formulae (I) and (II).

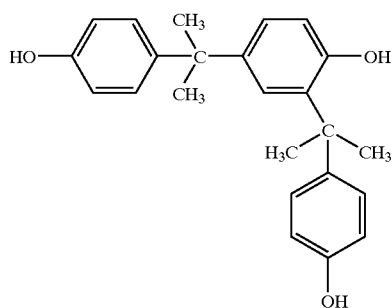

(I)

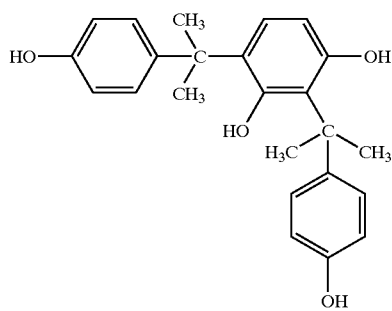

(II)

(5) The carbonate diester as a raw material is selected from those whose sodium compound content is very small. The carbonate diester, particularly diphenyl carbonate, contains a very small amount of a sodium compound due to a catalyst used in the step of production thereof. Since the above sodium compound contained in a very small amount has not a little influence on the occurrence of the light-emitting undissolved substances in the polymerization, the diphenyl carbonate as a raw material is selected from those in which the total content of the sodium compound is very small.

Of the above (1) to (5), (2) to (5) are means of preventing the occurrence of the light-emitting undissolved substances, and it is desirable to employ a proper combination thereof. Naturally, these means (1) to (5) are mere illustrative examples, and other means may be employed. Further, any combination of these means may be employed, or these means may be used in combination with other means.

According to studies made by the present inventors, it has been found that there can be obtained a disk substrate that is further improved in thermal stability for a long period of time and exhibits a decreased number of white spots occurring, by decreasing the content of the light-emitting undissolved substances in the polycarbonate resin to the above specific range and further by (i) adjusting the relative fluorescence intensity of the resin to a specific value or less and/or (ii) adjusting the activity index of a residual catalyst of the resin to a specific value or less.

According to the present invention, further, there are provided the following disk substrates (I) to (III).

(I) An optical disk substrate formed of a resin
   (A) that is an aromatic polycarbonate resin obtained by a reaction between an aromatic dihydroxy compound and a carbonate diester,
wherein:
   (B) the content of undissolved substances that emit light by irradiation with light having a wavelength of 380 nm and have a size of 30 μm or greater is 100 pieces or less per kg of said resin, and
   (C) the resin has a relative fluorescence intensity, based on a reference substance, of $4\times10^{-3}$ or less at 465 nm when the resin is measured for fluorescence spectrum.

(II) An optical disk substrate formed of a resin
   (A) that is an aromatic polycarbonate resin obtained by a reaction between an aromatic dihydroxy compound and a carbonate diester,
wherein:
   (B) the content of undissolved substances that emit light by irradiation with light having a wavelength of 380 nm and have a size of 30 μm or greater is 100 pieces or less per kg of said resin, and
   (D) the resin has a residual catalyst activity index of 2% or less.

(III) An optical disk substrate formed of a resin
   (A) that is an aromatic polycarbonate resin obtained by a reaction between an aromatic dihydroxy compound and a carbonate diester,
wherein:
   (B) the content of undissolved substances that emit light by irradiation with light having a wavelength of 380 nm and have a size of 30 μm or greater is 100 pieces or less per kg of said resin,
   (C) the resin has a relative fluorescence intensity, based on a reference substance, of $4\times10^{-3}$ or less at 465 nm when the resin is measured for fluorescence spectrum, and
   (D) the resin has a residual catalyst activity index of 2% or less.

In each of the above disk substrates (I) to (III) after the accelerated deterioration test (80° C.×85%RH×1,000 hours), desirably, the number of white spots having a size of 20 μm or greater per disk substrate having a diameter of 120 mm is an average of 2 pieces or less, preferably an average of 1.5 pieces or less.

When the above disk substrates (I) to (III) is measured for fluorescence spectrum, the relative fluorescence intensity of the resin based on a reference substance at 465 nm is $4\times10^{-3}$ or less, preferably $3\times10^{-3}$ or less, particularly preferably $2\times10^{-3}$ or less. When the above relative intensity exceeds the above value, the substrate tends to show a decrease in humidity resistance, heat resistance and mechanical properties.

Desirably, the following means is employed for obtaining a polycarbonate resin having a relative fluorescence intensity of the above specific value or less. Preferably, the amount of the polymerization catalyst is to be defined as described above, said polymerization catalyst is to be deactivated with a sulfonic acid compound, and the amount ratio of hydroxy groups to all the molecular terminals is to be defined with regard to terminals of molecule of the polycarbonate.

Further, preferably, the temperature of the polycarbonate resin in the melt-polymerization reaction is constantly maintained at 300° C. or lower, particularly preferably at 255° C. or lower, for obtaining a polycarbonate resin having a relative fluorescence intensity of the above specific value or less.

Further, with regard to stirring with a polymerizer stirring blade, it is preferred to adjust a value obtained by dividing the stirring shear rate of the polymerizer stirring blade (unit: 1/sec) represented by the following equation by a square of radius of the stirring blade (unit: cm) to 0.1 to 0.001 (1/(sec×cm$^2$)), for obtaining a polycarbonate resin having a relative fluorescence intensity of the above specific value or less.

Stirring shear rate=peripheral velocity of stirring blades/ length of gap between reactor and stirring blade (in which the unit of the stirring shear rate is 1/sec, the unit of the peripheral velocity of the stirring blade is cm/sec, and the length of the gap of the stirring blade is cm).

With regard to the catalyst system in the production of the polycarbonate resin, a basic nitrogen compound and an alkali metal compound (particularly, a sodium compound) are used, and in this case, the amount of the alkali metal compound is controlled to be 5.0×10$^{-6}$ mol or less per mole of the dihydric phenol, whereby a polycarbonate having a relative fluorescence intensity of a low value can be obtained. It is preferred to employ the above means in a proper combination.

In the disk substrates (II) and (III), essentially, the resin has a residual catalyst activity index of 2% or less, preferably 1% or less.

In the polycarbonate resin obtained by melt-polymerization, a polymerization catalyst is used for promoting the reaction thereof, and the polymerization catalyst often remains after the polymerization. If the remaining catalyst is left as it is after completion of the polymerization, there is caused a detrimental effect that the catalytic activity of the polymerization catalyst causes the polycarbonate resin to undergo decomposition or a re-reaction. Further, in the polycarbonate resin having such residual catalyst activity, not only the influence thereof spreads, but also there is sometimes caused a new problem on the retention of performances of the disk substrate, so that it is preferred to inhibit the residual catalyst activity.

Measurement is carried out in the following manner using a residual catalyst activity index as an index for inhibiting the residual catalyst activity. A rotary rheometer that can measure a sample as a measurement object for a value in a melt viscosity range is used as a measuring device, and a change in melt viscosity is observed while the sample is rotated in a constant direction at a constant angular velocity in a nitrogen current sufficient for the freedom of the sample from oxidation with external oxygen under constant-temperature conditions where a resin to be measured is melted. As a tool for a viscoelasticity measuring device for measuring the sample, a tool having the form of a conical disk is used such that a strain in the entire sample is constant, that is, that the shear speed comes to be constant. That is, a change in melt viscosity per minute, calculated on the basis of the following expression (i), is taken as a residual catalyst activity index.

$$\text{Residual catalyst activity index (\%)} = \frac{|(\text{Melt viscosity after 30 minutes} - \text{melt viscosity after 5 minutes})|}{\text{Melt viscosity after 5 minutes} \times 25} \times 100 \quad (i)$$

The above residual catalyst activity index is preferably 2% or less, more preferably 1% or less, still more preferably 0.5% or less, and most preferably 0.2% or less. When the residual catalyst activity index is in the above range, desirably, there is almost no change in performances of the disk substrate with the passage of time.

For bringing the residual catalyst activity index of the resin into the above value, effectively, not only the amount of the polymerization catalyst is relatively decreased, but also a deactivator for removing the activity of the catalyst is added to the resin after completion of the polymerization. Examples of the above deactivator include bezenesulfonic acid, p-toluenesulfonic acid; sulfonate esters such as methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate and phenyl p-toluenesulfonate: and further include compounds such as trifluoromethanesulfonic acid, naphthalenesulfonic acid, sulfonated polystyrene, a methyl acrylate-sulfonated styrene copolymer, 2-phenyl-2-propyl dodecylbenzenesulfonate, 2-phenyl-2-butyl dodecylbenzenesulfonate, octylsulfonic acid tetrabutylphosphonium salt, decylsulfonic acid tetrabutylphosphonium salt, benzenesulfonic acid tetrabutylphosphonium salt, dodecylbenzenesulfonic acid tetraethylphosphonium salt, dodecylbenzenesulfonic acid tetrabutylphosphonium salt, dodecylbenzenesulfonic acid tetrahexylphosphonium salt, dodecylbenzenesulfonic acid tetraoctylphosphonium salt, decylammonium butylsulfate, decylammonium decylsulfate, dodecylammonium methylsulfate, dodecylammonium ethylsulfate, dodecylmethylammonium methylsulfate, dodecyldimethylammonium tetradecylsulfate, tetradecyldimethylammonium methylsulfate, tetramethylammonium hexylsulfate, decyltrimethylammonium hexadecylsulfate, tetrabutylammonium dodecylbenzylsulfate, tetraethylammonium dodecylbenzylsulfate and tetramethylammonium dodecylbenzylsulfate, although the deactivator shall not be limited thereto. These compounds may be used in combination of two or more.

Of these deactivators, phosphonium or ammonium salt type deactivators are advantageous since they are stable themselves at 200° C. or higher. When the deactivator is added to the polycarbonate resin, it promptly neutralizes the polymerization catalyst to give a stable polycarbonate resin. That is, the amount of the deactivator based on the polycarbonate resin formed after the polymerization is preferably 0.01 to 500 ppm, more preferably 0.01 to 300 ppm, particularly preferably 0.01 to 100 ppm.

Concerning the amount ratio of the above deactivator to the polymerization catalyst, further, it is preferred to use the above deactivator in an amount of 0.5 to 50 mol per mole of the polymerization catalyst. The method of adding the deactivator to the polycarbonate resin after the polymerization is not restricted. For example, the deactivator may be added while the polycarbonate resin as a reaction product is in a molten state, or it may be added to the polycarbonate resin that is once pelletized and then re-melted. In the former, while the polycarbonate resin that is a reaction product in a molten state in a reactor or an extruder after completion of the reaction is in a molten state, the deactivator may be added, and the polycarbonate resin may be molded and then pelletized through the extruder. Alternatively, the deactivator may be added and kneaded with the polycarbonate resin at any time when the polycarbonate resin obtained by the polymerization passes from the reactor to the extruder and then pelletized, whereby the polycarbonate resin is obtained.

EXAMPLES

The present invention will be explained in detail with reference to Examples hereinafter, while the present invention shall not be limited by these Examples. In Examples, "part" stands for "part by weight".

In Examples, substances that occurred and white spots that occurred in disks were measured for numbers by the following methods.

(1) Measurement of Light-emitting Undissolved Substances for Numbers

A certain amount of a polycarbonate resin was dissolved in methylene chloride, a solution was filtered through a 30 µm filter at a normal temperature under normal pressure, a residue on the filter was dried and substances that emit light by irradiation with light having a wavelength of 380 nm were observed through an optical microscope to count a number thereof. The number was converted to a value per kg of the resin, and the value was shown.

(2) Measurement of Number of White Spots Before and After High-temperature High-humidity Treatment For reproducing an increase in the number of white spots when a disk was left under severe atmosphere for a long period of time, the disk was held in a constant-temperature constant-humidity chamber controlled to have a temperature of 80° C. and a relative humidity of 85% for 1,000 hours, and then, a number of white spots having a size of 20 µm or greater was counted through a polarization microscope. Twenty-five optical disk substrates (diameter 120 mm) were measured, and an average of counted numbers was calculated and used as the number of the white spots. Similar measurements were also carried out with regard to the disk substrates before the treatment.

(3) Relative Fluorescence Intensity

A polycarbonate resin and a reference substance were measured for fluorescence intensities at 465 nm under the following conditions, and a ratio thereof (relative fluorescence intensity=fluorescence intensity of polycarbonate resin/fluorescence intensity of reference substance) was calculated.

| Measurement conditions | |
|---|---|
| Apparatus | Hitachi F4500 |
| Lamp | Xe, 150 W |
| Slit width | Ex/Em  2.5 mm each |
| Photomulti plier | 400 W |
| Sample (concentration) | 1 mg polycarbonate resin 5 ml methylene chloride |

Comparative Reference Substance: $1.0 \times 10^{-3}$ mg/ml phenyl salicylate in methylene chloride (4) Residual Catalyst Activity Index The residual catalyst activity index was measured as follows. A resin sample was dried under reduced pressure at 120° C. for 4 hours before a use for the measurement. An RDA-II model viscoelasticity measuring machine supplied by Rheometrics Co. was used as a measuring machine, a tool having the form of a conical disk having a diameter of 25 mm was attached, and the measurement condition was set at a measurement temperature of 270° C. under nitrogen current as proper conditions for a sample under measurement. The measurement temperature was set on the basis of measurements of temperatures in an oven. Then, a dried sample for measurement was set and left such that the entire sample had a sufficient measurement temperature, and then the sample was rotated at an angular velocity of 1 rad/second to start measurements. This procedure was continued for 30 minutes, and a change in melt viscosity during this period was observed. On the basis of the above measurements, melt viscosities 5 minutes and 30 minutes after the start of the rotation were determined, and the following expression (i) was used for a calculation using these values, whereby a change in melt viscosity per minute was obtained and shown as a residual catalyst activity index.

$$\text{Residual catalyst activity index (\%)} = \frac{|(\text{Melt viscosity after 30 minutes} - \text{melt viscosity after 5 minutes})|}{\text{Melt viscosity after 5 minutes} \times 25} \times 100 \quad \text{(i)}$$

(5) Concentration of Terminal Hydroxyl Groups 0.02 Gram of a resin sample was dissolved in 0.4 ml of chloroform and measured for terminal hydroxy groups and terminal phenyl groups at 20° C. by $^1$H-NMR (EX-270, supplied by JEOL Ltd.), and a terminal hydroxyl group concentration was calculated on the basis of the following expression (ii).

Terminal hydroxy group concentration (mol %)=(number of terminal hydroxyl groups/total number of terminals)×100 (ii)

Example 1

A polycarbonate resin was prepared as follows. A reaction vessel having a stirrer, a rectifier column and a pressure-reducing device was charged with 137 parts of purified bisphenol A (BPA) and 135 parts of purified diphenyl carbonate (DPC) as raw materials and with $1.2 \times 10^{-5}$ part of sodium hydroxide and $7.3 \times 10^{-3}$ part of tetramethylammonium hydroxide as a polymerization catalyst, and these were melted under a nitrogen atmosphere at 180° C.

The reaction vessel was internally pressure-reduced to 13 kPa with stirring at a rotation velocity of 40 r.p.m., and the raw materials were allowed to react for 20 minutes while a phenol formed is distilled off. Then, the temperature in the reaction vessel was elevated to 200° C., the pressure was gradually reduced and while phenol was distilled off, the reaction was carried out at 4.0 kPa for 20 minutes. Further, the temperature was gradually increased and the reaction was carried out at 220° C. for 20 minutes, at 240° C. for 20 minutes and at 250° C. for 20 minutes. Then, while the reaction mixture was stirred at a rotation velocity of 30 r.p.m. at 255° C., the pressure was gradually reduced, and the reaction was continued at 2.7 kPa for 10 minutes and at 1.3 kPa for 5 minutes. Then, for maintaining the temperature of a shear portion of a stirring blade and the reaction vessel where the temperature was most increased inside a polymerization apparatus, at 305° C. or lower, the rotation velocity was changed to 20 r.p.m. when the viscosity average molecular weight came to be 10,000 on the basis of a relationship between a rotation power and a viscosity average molecular weight, and finally, at 250 to 255° C./67 Pa (taking care to constantly keep 255° C. or lower) and while the value obtained by dividing the stirring shear velocity (unit: l/sec) of the stirring blade of the polymerization vessel with a square of the radius (unit: cm) of the stirring blade was maintained at 0.001 (l/sec×cm$^2$), polycondensation was continued until the viscosity average molecular weight of the aromatic polycarbonate resin came to be 15,300.

Then, $1.2 \times 10^{-4}$ part of dodecylbenzenesulfonic acid tetrabutylphosphonium salt was added thereto, and a mixture was stirred at 260° C./67 Pa for 10 minutes.

Then, the polycarbonate resin was transferred to an extruder with a gear pump. While the polycarbonate resin was somewhere in the extruder, a mold release agent (0.08% by weight of glycerin monostearate) and a heat stabilizer (0.01% by weight of tris(2,4-di-tert-butylphenyl)phosphite) were added, to give a polycarbonate resin having a viscosity average molecular weight of 15,300, a terminal hydroxyl group concentration of 37 mol %, an undissolved substance content of 7 pieces, a relative fluorescence intensity of $1.3 \times 10^{-3}$ and a residual catalyst activity of 0.1 (%).

A disk substrates were produced from the thus-obtained pellets by the following method.

That is, the disk substrate was produced with an injection molding machine DISK3M3 supplied by Sumitomo Heavy Machinery Inc., and a mold having a cavity having a thickness of 1.2 mm and a diameter of 120 mm and having, set therein, a stamper having a concavo-convex form corresponding to information signals, at a barrel temperature of 340° C.

An aluminum reflection layer was formed on the thus-obtained disk substrate by sputtering, to give an optical information recording medium. The information recording medium was measured for an error ratio with an evaluation apparatus CD-CATS supplied by Audio Development AB. Table 1 shows the content of substances that emitted light by irradiation with light having a wavelength of 380 nm in the substrate, as "Content of light-emitting substances".

Example 2

Polycarbonate pellets having a viscosity average molecular weight of 15,300, a terminal hydroxyl group concentration of 35 mol %, an undissolved substance content of 5 pieces, a relative fluorescence intensity of $1.0 \times 10^{-3}$ and a residual catalyst activity index of 0.1 (%) were obtained in the same manner as in Example 1 except that the sodium hydroxide as a catalyst was replaced with bisphenol A disodium salt (approximately $5 \times 10^{-7}$ mol/biphsenol A 1 mol). These polycarbonate pellets were evaluated in the same manner as in Example 1.

Comparative Example 1

A reactor with a thermometer, a stirrer and a reflux condenser was charged with 219.4 parts of deionized water, 40.2 parts of a 48% sodium oxide aqueous solution and 0.12 part of hydrosulfite, and 57.5 parts of 2,2-bis(4-hydroxyphenyl)propane was dissolved with stirring. Then, 181 parts of methylene chloride was added, and 28.3 parts of phosgene was added by blowing at 20 to 25° C. over 40 minutes, to carry out a reaction, whereby a polycarbonate oligomer was obtained. The reaction mixture was temperature-adjusted to 30° C., and then, 1.24 parts of p-tert-butylphenol and 7.2 parts of a 48% sodium hydroxide aqueous solution were added to form an emulsion. Then, the emulsion was stirred for 2 hours to complete the reaction.

After completion of the reaction, the emulsion was diluted by adding 246 parts of methylene chloride, to form a solution of 14% by weight of a polycarbonate resin in methylene chloride. Then, an organic phase was adjusted to be hydrochloric acid acidic and then repeatedly washed with water. When the electric conductivity of an aqueous phase came to be nearly the same as that of deionized water, a polycarbonate solution was dropwise added to warm water in a kneader, and a polycarbonate resin was formed into flakes while methylene chloride was distilled off. Then, the above liquid-containing polycarbonate resin was pulverized and dried to give a polycarbonate resin powder. After the power was dried, 0.08% by weight of glycerin monostearate and 0.05% by weight of trisnonylphenyl phosphite were added, and the mixture was extruded with a vented twin-screw extruder at a cylinder temperature of 270° C. under a vent pressure of 6.7 kPa, to form pellets. The thus-obtained pellets had a viscosity average molecular weight of 15,300, a terminal hydroxyl group concentration of 12 mol % and an undissolved substance content of 5 pieces.

Comparative Example 2

A reactor with a stirrer and a distillation column was charged with 228 parts by weight of 2,2-bis(4-hydroxyphenyl)propane and 219 parts by weight of diphenyl carbonate (supplied by Bayer AG) and with 0.0001 part by weight of sodium hydroxide and 0.0073 part by weight of tetramethylammonium hydroxide as a catalyst, and the inside of reactor was substituted with nitrogen. The resultant mixture was heated up to 200° C. to be dissolved with stirring. Then, the pressure reduction degree was set at 4 kPa, and a major part of phenol was distilled off under heat in 1 hour. Further, the remainder was temperature-increased up to 290° C. and the pressure reduction degree was adjusted to 133 Pa to carry out a reaction for polymerization. Then, without using dodecylbenzenesulfonic acid tetrabutylphosphonium salt as a catalyst neutralizer, the polycarbonate resin was transferred to an extruder with a gear pump. While the polycarbonate resin was somewhere in the extruder, 0.08% by weight of glycerin monostearate and 0.01% by weight of tris(2,4-di-tert-butylphenyl)phosphite were added, to give aromatic polycarbonate resin pellets having a viscosity average molecular weight of 15,300, a terminal hydroxyl group concentration of 74 mol %, an undissolved substance content of 120 pieces, a relative fluorescence intensity of $5.8 \times 10^{-3}$ and a residual catalyst activity of 2.1.

TABLE 1

|  | Ex.1 | Ex.2 | C.Ex.1 | C.Ex.2 |
| --- | --- | --- | --- | --- |
| Polymerization method | Melting method | Melting method | Solution method | Melting method |
| Un-dissolved substances [number/kg] | 7 | 5 | 5 | 120 |
| Residual catalyst activity index [%] | 0.1 | 0.1 |  | 2.1 |
| Relative fluorescence intensity ($\times 10^3$) | 1.3 | 1.0 |  | 5.8 |
| Terminal hydroxy group (mol %) | 37 | 35 | 12 | 74 |

TABLE 1-continued

|  |  | Ex.1 | Ex.2 | C.Ex.1 | C.Ex.2 |
|---|---|---|---|---|---|
| Error ratio (before high-temperature high-humidity treatment) |  | $2.6 \times 10^{-5}$ | $2.1 \times 10^{-5}$ | $2.2 \times 10^{-5}$ | $1.2 \times 10^{-3}$ |
| AA | BAA | 0.1 | 0.1 | 0.1 | 1.9 |
|  | AAA | 0.3 | 0.2 | 2.3 | 3.0 |

Ex. = Example
C.Ex. = Comparative Example
AA: Number of white spots
BAA: Before high-temperature high-humidity treatment
AAA: After high-temperature high-humidity treatment

What is claimed is:

1. An optical disk substrate formed of an aromatic polycarbonate resin obtained by a reaction between an aromatic dihydroxy compound and a carbonate diester and in which the content of undissolved substances that emit light by irradiation with light having a wavelength of 380 nm and have a size of 30 μm or greater is 100 pieces or less per kg of said resin.

2. The optical disk substrate of claim 1, wherein, after an accelerated deterioration test (80° C.×85%RH×1,000 hours), the number of occurred white spots having a size of 20 μm or greater per disk substrate having a diameter of 120 mm is an average of 2 pieces or less.

3. The optical disk substrate of claim 1, which is formed of the resin in which the content of undissolved substances that emit light by irradiation with light having a wavelength of 380 nm and have a size of 30 μm or greater is 80 pieces or less per kg of said resin.

4. The optical disk substrate of claim 1, wherein the number of occurred white spots having a size of 20 μm or greater per disk substrate having a diameter of 120 mm after the accelerated deterioration test is an average of 1.5 pieces or less.

5. The optical disk substrate of claim 1, wherein said resin has a relative fluorescence intensity of $4 \times 10^{-3}$ or less at 465 nm based on a reference substance when measured for fluorescence spectrum.

6. The optical disk substrate of claim 1, wherein said relative fluorescence intensity of the resin is $3 \times 10^{-3}$ or less.

7. The optical disk substrate of claim 1, wherein said resin has a residual catalyst activity index of 2% or less.

8. The optical disk substrate of claim 1, wherein said resin has a residual catalyst activity index of 1% or less.

9. The optical disk substrate of claim 1, wherein the resin contains $1 \times 10^{-8}$ to $1 \times 10^{-5}$ mol, per mole of the aromatic dihydroxy compound, of a metal catalyst and 0.5 to 50 mol, per mole of the metal catalyst, of a catalyst deactivator.

10. The optical disk substrate of claim 1, wherein said resin has a viscosity average molecular weight of 10,000 to 22,000.

11. The optical disk substrate of claim 1, wherein said resin is an aromatic polycarbonate resin obtained by using bisphenol A as the aromatic dihydroxy compound.

12. An optical disk substrate formed of a resin, wherein;

(A) the resin is an aromatic polycarbonate resin obtained by a reaction between an aromatic dihydroxy compound and a carbonate diester, (B) the resin has 100 pieces or less per kg of said resin of undissolved substances that emit light by irradiation with light having a wavelength of 380 nm and have size of 30 μm or greater, (C) the resin has a relative fluorescence intensity, based on a reference substance, of $4 \times 10^{-3}$ or less at 465 nm when the resin is measured for fluorescence spectrum, and (D) the resin has a residual catalyst activity index of 2% or less.

13. The optical disk substrate of claim 12, wherein after an accelerated deterioration test (80° C.×85%RH×1,000 hours), the number of occurred white spots having a size of 20 μm or greater per disk substrate having a diameter of 120 mm is an average of 2 pieces or less.

14. A molding material for optical use, which is an aromatic polycarbonate resin obtained by a reaction between an aromatic dihydroxy compound and a carbonate diester, and which is also a resin in which the content of undissolved substances that emit light by irradiation with light having a wavelength of 380 nm and have a size of 30 μm or greater is 100 pieces or less per kg of said resin.

15. The molding material for optical use as recited in claim 14, wherein said resin has a relative fluorescence intensity, based on a reference substance, of $4 \times 10^{-3}$ or less at 465 nm when the resin is measured for fluorescence spectrum.

16. The molding material for optical use as recited in claim 14, wherein said resin has a residual catalyst activity index of 1% or less.

17. An optical disk formed from a molding material comprising an aromatic polycarbonate resin obtained by a reaction between an aromatic dihydroxy compound and a carbonate diester, wherein the resin has a content of undissolved substances that emit light by irradiation with light having a wavelength of 380 nm and have a size of 30 μm or greater which is 100 pieces or less per kg of said resin.

18. The optical disk as recited in claim 17, wherein said resin has a relative fluorescence intensity, based on a reference substance, of $4 \times 10^{-3}$ or less at 465 nm when the resin is measured for fluorescence spectrum.

19. The optical disk as recited in claim 17, wherein said resin has a residual catalyst activity index of 1% or less.

* * * * *